United States Patent
Stallard, III

[11] Patent Number: 6,007,022
[45] Date of Patent: Dec. 28, 1999

[54] INTERNAL COMBUSTION CATAPULT

[75] Inventor: Clinton W. Stallard, III, Hampton, Va.

[73] Assignee: Newport News Shipbuilding, Newport News, Va.

[21] Appl. No.: 08/967,052

[22] Filed: Nov. 10, 1997

Related U.S. Application Data

[60] Provisional application No. 60/029,548, Nov. 8, 1996, and provisional application No. 60/029,547, Nov. 8, 1996.

[51] Int. Cl.⁶ .................................................... B64F 1/04
[52] U.S. Cl. ............................................................ 244/63
[58] Field of Search ................................. 89/8, 7; 244/63

[56] References Cited

U.S. PATENT DOCUMENTS

| | | | |
|---|---|---|---|
| 2,799,988 | 7/1957 | Larrecq et al. | 244/63 |
| 2,906,475 | 9/1959 | Doolittle et al. | 244/63 |
| 3,214,909 | 11/1965 | Gordon | 89/7 |
| 3,350,038 | 10/1967 | Oberlander | 244/63 |
| 3,420,053 | 1/1969 | Tyler et al. | 244/63 |
| 3,428,273 | 2/1969 | Tyler | 244/63 |
| 3,600,887 | 8/1971 | Gault et al. | 60/39.28 |
| 3,969,978 | 7/1976 | Seifert et al. | 89/7 |
| 4,164,890 | 8/1979 | Elmore et al. | 89/185 |
| 4,344,592 | 8/1982 | Constantinescu | 89/1.805 |
| 4,644,843 | 2/1987 | Soper | 89/7 |
| 4,653,380 | 3/1987 | Griffing et al. | 89/7 |
| 4,664,631 | 5/1987 | Pederson et al. | 434/16 |
| 4,928,571 | 5/1990 | Bulman | 89/7 |
| 4,934,242 | 6/1990 | Bulman | 89/7 |
| 5,612,506 | 3/1997 | Goldstein | 102/472 |
| 5,650,585 | 7/1997 | Pate et al. | 89/7 |

*Primary Examiner*—Theresa M. Wesson
*Attorney, Agent, or Firm*—Lalos & Keegan

[57] ABSTRACT

An internal combustion catapult for loads such as an aircraft using much of the conventional steam system in that an existing elongated launch tube is utilized with an existing movable piston. The steam generation system may be replaced and a plurality of combustors positioned at the aft end of the launch tube facing the trailing end of the piston. Each of these combustors includes an injector assembly for supplying a combustible propellant. At least one igniter is operatively positioned with respect to the combustor to ignite the combustible propellant to form hot launch gases at high pressure to project the piston down the launch tube to launch the aircraft. A water manifold injects water into the combustion gases to cool them and form steam to propel the piston down the launch tube. The propellant may be a propellant composed of, for example, hydroxylammonium nitrate and a hydrocarbon fuel or a bipropellant system using a combustible fuel composed of organic substances and an oxidizer such as ammonium nitrate, hydroxylammonium nitrate, hydrazine, nitrogen tetroxide and liquid oxygen.

30 Claims, 5 Drawing Sheets

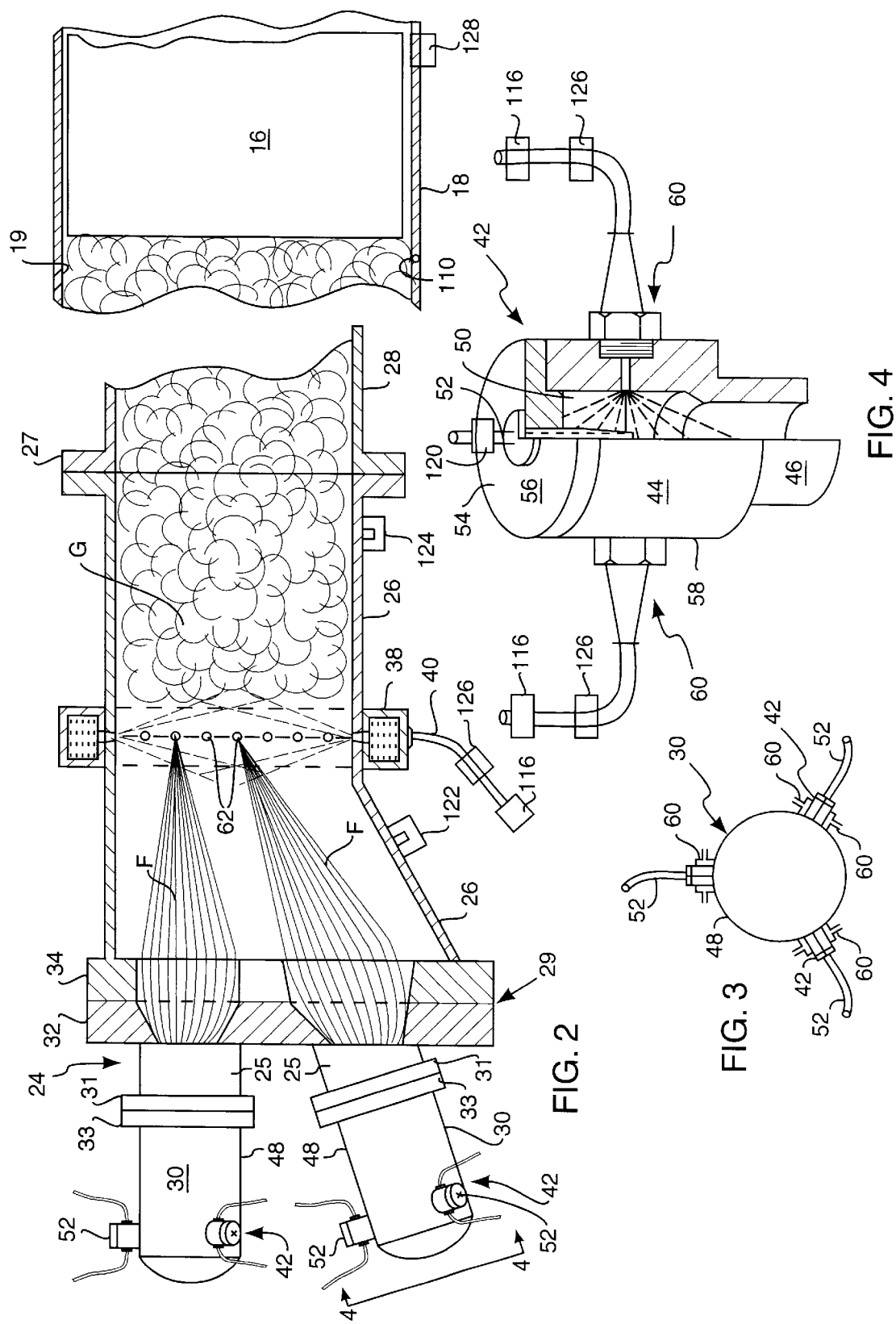

INTERNAL COMBUSTION CATAPULT

This application claims the benefit of U.S. Provisional Application Ser. No. 60/029,547, filed Nov. 8, 1996, and U.S. Provisional Application Ser. No. 60/029,548, filed Nov. 8, 1996.

BACKGROUND OF THE INVENTION

The present invention relates to an apparatus for launching at high velocity an airborne device particularly an aircraft, though any other device could be so propelled.

Aircraft launchers on today's aircraft carriers generally propel the aircraft to be launched using steam that is generated by the same system that provides steam for propulsion of the vessel. Such use of the steam available on seaborne vessels produces a significant weight increase. In the first place, the steam generating machinery must be larger. Secondly, the piping, valves, accumulators and other machinery needed to store steam at high pressure in readiness for application to a catapult launch add weight. Also the conventional steam catapult requires the apparatus for steam launching to be positioned relatively high on the ship. This reduces in a large measure the desirable upper level space required for other purposes. Also the added weight produces a higher center of gravity. Neither of these is a desirable feature in any vessel.

Another drawback of the steam catapult is that it forces, from an overall life-cycle cost standpoint, the use of steam for propulsion rather than such alternatives as gas turbines and diesel engines. Still another drawback is that existing steam catapults are open loop systems: Once the steam launching valve is opened, no further control of the system is provided.

Accordingly, it is desired to provide an internal combustion catapult launcher that is independent of the propulsion plant in that there is no requirement for propulsion steam. Further, it is desired that the launcher have a very accurate end speed control and an acceleration profile that reduces stress on the launcher and aircraft. The internal combustion catapult should be a closed-loop control system in contrast to the conventional steam catapult that is open-loop control. Ideally the system is easily retrofitted to existing steam catapult launchers. It is also desirable that the launch system sense transient conditions such as loss of power from the launching aircraft due to engine failure and compensate by increasing launch force to assure the desired launch end speed. These and many other requirements cannot be met with a conventional steam launching system utilizing the steam from the ship's propulsion system.

SUMMARY OF THE INVENTION

The present invention is an internal combustion airplane catapult launcher using much of the conventional steam system in that an existing elongated launch tube is utilized with an existing movable piston. However, the steam generation system now is replaced and a plurality of combustors is positioned at the aft end of the launch tube facing the trailing end of the piston. Each of these combustors includes an injector assembly for supplying a combustible propellant. At least one igniter is operatively positioned with respect to the combustor to ignite the combustible propellant to form hot launch gases at high pressure to project the piston down the launch tube to launch the aircraft. It is also part of the invention to provide a water manifold to inject water into the combustion gases to cool them and form steam to assist in propelling the piston down the launch tube. The propellant may be a propellant composed of, for example, hydroxylammonium nitrate and a hydrocarbon fuel. More preferably the propellant is a bipropellant system using as one component a combustible fuel composed of organic substances and as the second component an oxidizer such as ammonium nitrate, hydroxylammonium nitrate, hydrazine, nitrogen tetroxide and liquid oxygen.

THE DRAWTHE

FIG. 2 is a cross-sectional view partly broken away of the launch tube, the water manifold and the combustors producing the launch gases and steam.

FIG. 3 is a perspective view partly in cross section of one of the injector assemblies including a plurality of igniters and supply conduits of the combustible propellant.

FIG. 4 is an end view taken along lines 4—4 of FIG. 2.

DESCRIPTION OF THE PREFERRED EMBODIMENT

Figure 1:
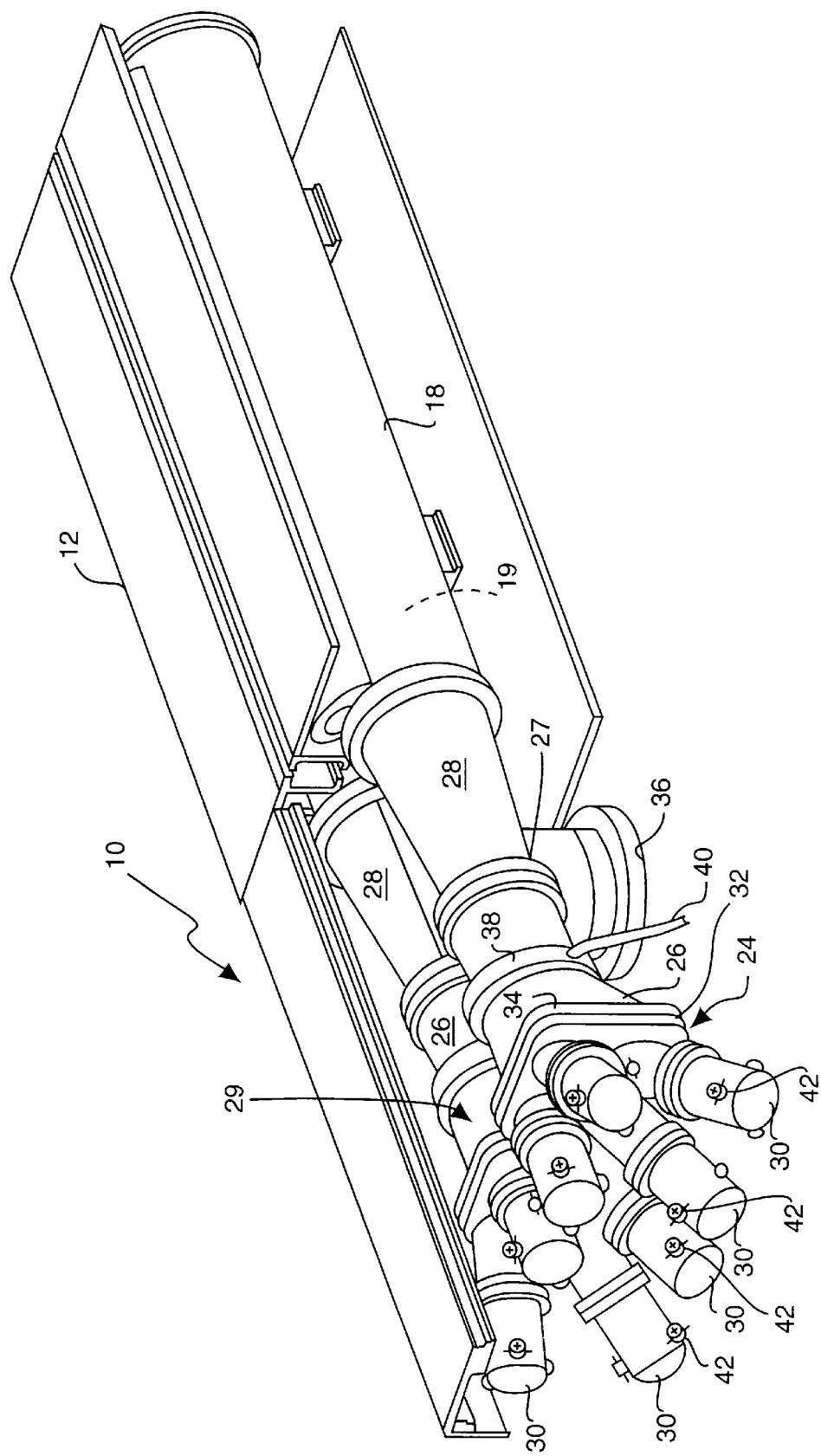
FIG. 1 is a perspective view of the internal combustion airplane catapult launcher of the present invention illustrating the dual launch tubes to each of which is attached the conventional thrust exhaust section and thereafter the internal combustion manifold with a plurality of combustors at the aft end.
Figure 8:
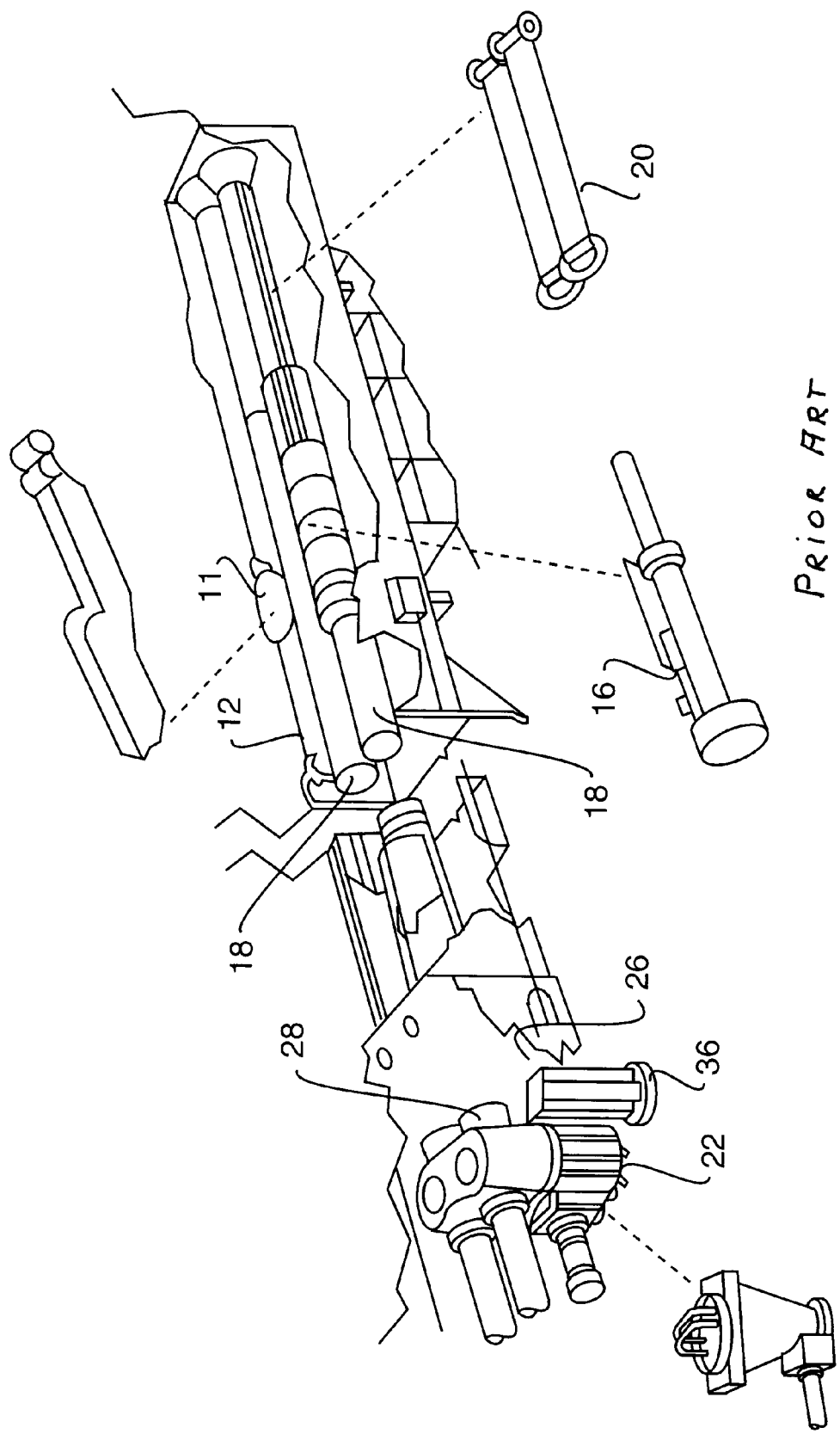
FIG. 8 is a perspective view of the prior art steam catapult.

FIGS. 1, 2 and 8 show the present invention as embodied in an internal combustion airplane catapult 10. In general, the catapult of the present invention includes the conventional aircraft carrier flight deck 12 through which a conventional shuttle 11, as best shown in FIG. 8 depicting the prior art, is operated by being connected to the piston 16 (FIG. 2) in each launch or cylinder tube 18, 18. Hereinafter only one launch tube 18 and launch piston 16 will be described.

As is well known in the art, the aircraft is connected to the shuttle 11 by means, not shown, for catapulting down the deck 12. As shown in the prior art FIG. 8, there is a water brake 20 of conventional design that is not shown in the present invention's depiction in FIG. 1. Water brake 20 would be disposed at the end of launch tube 18. The purpose of the water brake 20 is to slow and stop the piston 16 at the end of the catapult after the aircraft has been launched. The prior art conventional steam catapult also includes a steam launching valve 22 positioned at the thrustexhaust manifold 28 as part of and at the aft end of the launch tube 18, and steam exhaust piping 36 attached to thrust-exhaust manifold 28.

In the present invention the steam input system including launching valve 22 is removed. In place thereof launch gas plenum 26 is attached to thrust-exhaust manifold 28 at joint 27 both forming the aft portion of launch tube 18. For clarification everything forward of joint 27 is existing steam catapult structure; everything aft is the internal combustion catapult 10.

Combustor manifold 24 is attached to launch gas plenum 26 at joint 29. Combustor manifold 24 consists of flange 32, cylinders 25, which could be of any number, four is the preferred embodiment, and flange 31. Combustor manifold 24 is attached to launch gas plenum 26 as by bolting flange 32 of combustor manifold 24 to flange 34 of launch gas plenum 26. Cylindrically shaped combustors 30 are attached to the combustor manifold 24 as by bolting flange 33 to flange 31. Each combustor 30 is open into the launch gas plenum through combustor manifold 24.

Exhaust outlet 36, as shown in FIG. 1, is the same as that disclosed at 36 in the prior art and serves the same purpose: to exhaust the launch tube of the gases upon retraction of the piston 16 to its launch ready position shown in FIG. 2.

As shown in FIGS. 1 and 2, a water manifold 38 is secured to and around launch gas plenum 26 of launch tube 18 to supply a water spray into the launch gases as will be subsequently described. Suitable supply pipe 40 provides water to the manifold 38 from a water feed system described hereinafter.

Each combustor 30 has positioned around its aft end a plurality of at least two and perhaps as many as eight injector assemblies 42. The injector assembly is best shown in FIGS. 2, 3 and 4 wherein the injector assembly is provided with a cylindrical body 44 having a protruding cylindrical neck 46 for insertion through the wall 48 of the combustors 30. The cylindrical body 44 of the injector assembly 42 has an internal space 50 as shown in FIG. 3 for receiving the combustible propellant preferably through separate conduits and fittings or injectors 60, also forming part of the injector assembly 42. Each conduit and fitting or injector 60 may carry a separate component of the propellant if the propellant is a preferred bipropellant. Alternatively both fittings may supply a monopropellant.

In the end 56 and as part of each injector assembly 42 is an igniter 52. Igniters 52 form an ignition system that functions to achieve a reliable, rapid and smooth ignition upon excitation. It is possible that an igniter could be of a hot catalyst type well known in the art, a well-known pilot type igniting flame, or an electrical ignition system that would be conventional or even a combination of these two. A plurality of the igniters could be used and while only one is shown per injector assembly 42 it is possible that additional igniters could be utilized. It is also possible to use a conventional electrical plasma discharge system known as the "Railplug" that is particularly useful for liquid-fueled engines such as gasoline or diesel engines, and will ignite extremely lean fuel-to-air-ratio mixtures. Also a piezoelectric ignition system is possible using a pair of electrodes. It is important to note that the igniters 52 can be of any conventional design or future-developed designs that will ignite the fuel and oxidizer mixture.

The selection of the propellant is important in the present invention although there may be a number of different propellants utilized. For instance it is possible to choose a monopropellant composed of a mixture of hydroxyammonium nitrate as an oxidizer and a hydrocarbon fuel that could be any of the typical fuels well known such as the JP-5 grade of kerosene or other possible grades of kerosene or for that matter any other liquid organic substance such as gasoline, diesel oil, or vegetable oil such as peanut oil or the like. While hydroxylammonium nitrate is a preferred constituent of the propellant, other typical oxidizers that could be used are ammonium nitrate, hydrazine, nitrogen tetroxide, liquid oxygen and the like.

The monopropellant of mixed fuel and oxidizer is simpler and easier to use because there is not required to be a dual storage fuel system. However, storing a monopropellant such as a hydroxylammonium nitrate/JP-5 mixture constitutes an explosive prospect. Therefore, it is believed to be a more suitable system when fuel and oxidizer are separated into a bipropellant system in which separate fittings or injectors 60 as shown will conduct a continued separation of the combustible fuel and the oxidizer until they enter the interior space 50 for ignition by the igniter 52. The proportions of the oxidizer and the combustible fuel are conventional and are not critical to the present invention generally. However, the hydroxylammonium nitrate oxidizer represents from 75%–97% and preferably 85%–95% by weight of the propellant composition while the fuel such as the JP-5 represents the remainder of 3%–25% or preferably 5%–15% by weight of the mixture. More particularly, the oxidizer when present as hydroxylammonium nitrate is about 91%–93% by weight of the composition with 7%–9% by weight being hydrocarbon fuel in order to provide a stoichiometric reaction between the oxidizer and the fuel.

As best shown in FIGS. 1 and 2, a water manifold 38 is provided to spray water from a water feed system, to be described, through a plurality of spray nozzles 62 into the launch gas plenum 26 of the launch tube 18. In particular, the water manifold 38 is located at a point just forward of the combustors 30 so that the hot launch gases F will be in direct contact with the water spray to cool the gases somewhat and to produce a combination of combustion gases and steam as shown at G. The mixture of gases and steam G is under great pressure so as to move piston 16 down the launch tube.

In the use of this invention as a catapult for loads, the load would be substituted for piston 16. The forward end of launch cylinder 18 would be open, of course, so the water brake 20 would be omitted. There would be no need for the shuttle 11 nor flight deck 12. No slot in the top of launch cylinder 18 would be necessary.

In its embodiment as an airplane catapult, the most efficient launch profile is one of constant acceleration for the aircraft as this minimizes stresses on both the aircraft and its crew. For a gas-driven energy source as in the present invention, requirements for constant acceleration translate into the need for a progressively increasing gas flow during the stroke of the piston to maintain constant pressure on the face of the accelerating piston. In the present invention, the launch tubes may be preheated, if desired, to minimize thermal losses and avoid steam condensation on the walls of the launch cylinders or tubes 18. The velocity of the piston 16 at the end of its stroke is significantly below the speed of sound thus the gas pressures will be substantially the same throughout the launch tube. Any drop in pressure from one end of the launch tube to the other due to gas velocity will be very small. Thus the demand for the progressive increase in gas flow during the launch cycle is driven primarily by the accelerating volume expansion through the launch tube 18 during the launch. The combustors then must increase the gas flow rate into the launch tube as the piston moves down the tube.

The energy requirement for any launch scenario translates into a progressive increase in output from the combustors. The gas generator system will be sized so that the total increase for, as example, a 70 million foot-pound launch can be achieved by using as little as 58% of the capacity of each of the combustors 30 with the remaining 42% of the capacity of the combustors held in reserve. Each combustor thus would have the capability for a total variation in mass flow of approximately 5:1 that is achieved by throttling the rate of propellant induction into the combustion chamber in accordance with the propellant feed system that will be described hereinafter. All of the combustors 30 are brought in on line in parallel or sequentially as required. Output is suggested under closed loop control of the feed system to assure that the launch parameters for the aircraft and associated wind over the deck are met. Generating launch energy of 70 million foot-pounds will require the combustion of approximately 34 gallons of the combustible propellant. Each of the eight combustors in the system shown in FIGS. 1 and 2 will be sized to be capable of providing approximately 15 million foot-pounds of launch energy. Thus the eight combustors operating at 58% of capacity provide full power for a maximum launch. An appropriate quantity of water proportional to the propellant is approximately in the ratio of 2:1 by weight and is added in the form of the spray through the manifold 38 as previously described. This added water turns into steam to increase the mass flow of combustion products and steam and also to ensure that the combustion products entering the launch tube are not hotter than about 600° F.

Figure 5:
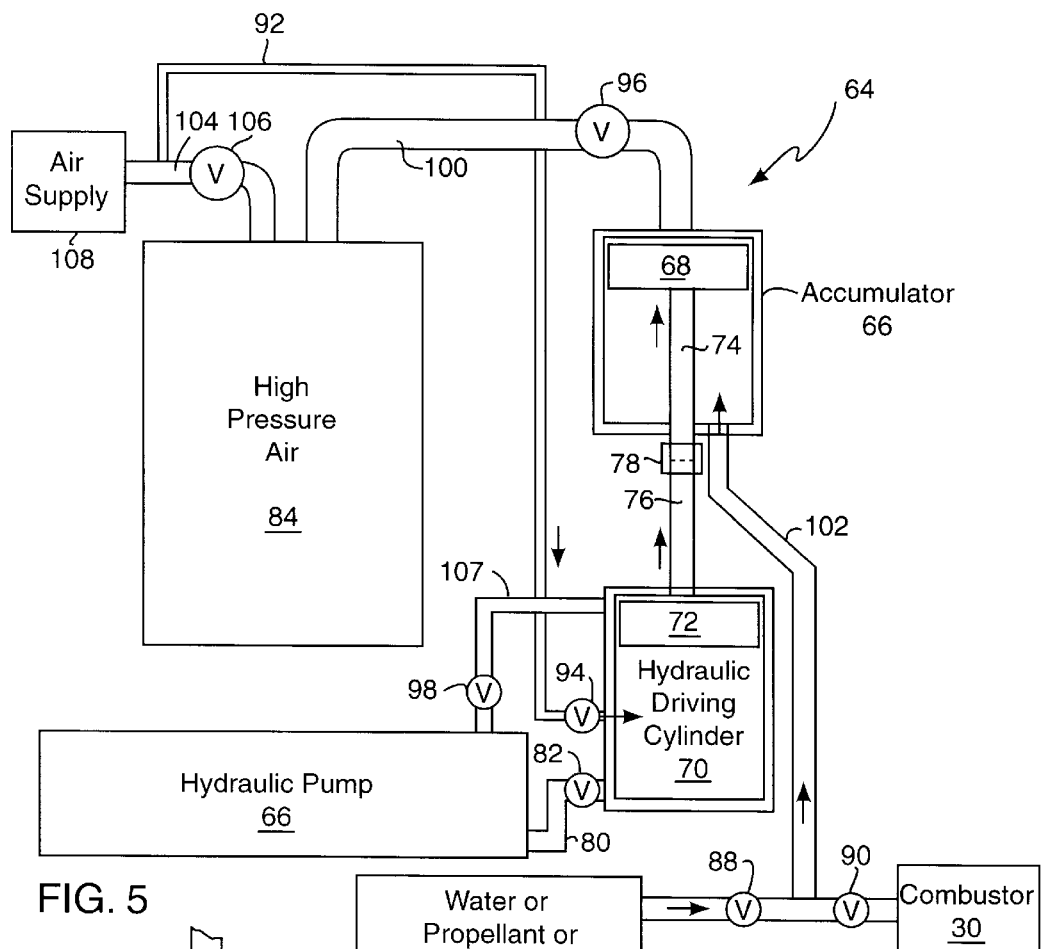
FIG. 5 is a schematic view of the feed system for the fuel, oxidizer and water showing the position of the pistons during the intake of propellant or water from the supply into the accumulator.

To supply the necessary propellant through conduits and fittings or injectors 60, or to supply only a single monopropellant as previously disclosed, and to supply the water to the manifold $^{38}$, a feed system for each is necessary. FIG. 5 discloses in schematic form a pump feed system depicted generally at 64. It is to be understood that water and either or both the fuel and oxidizer whether in the form of a monopropellant or separately provided would use the feed system 64 as shown. The purpose of feed system 64 is to provide sufficient flow rates to the combustors 30 and water manifold 38 so that they operate reliably and efficiently.

The prior art steam system relies upon energy as steam stored in a steam accumulator. When the steam accumulator is fully charged, sufficient energy for the launch is on hand and is available simply by opening launching valve 22 to admit the stored steam to the launch cylinder. However the present invention provides an energy source that is the equal of the steam supply system in cycle time, in delivered energy, and in reliability, and is superior in many respects, as already noted.

This is accomplished by the feed system 64 and the components now described. As shown in FIG. 5, hydraulic pump 67 is driven by an electric motor not shown. Preferably for present purposes the pump will typically have a rating of about 250 gallons per minute at 3,000 psi and the electric motor can have a rating of approximately 300 hp. The system 64 includes an accumulator 66, which is a cylinder that may be as large as 20 inches in diameter and has a piston 68 that may have a stroke of as much as 3 feet. Below the accumulator 66 is an identical hydraulic driving cylinder 70 with a piston 72. As shown, the piston rod 74 of the accumulator 66 is aligned to engage the corresponding piston rod 76 of the hydraulic driving cylinder piston 72 by means of coupling 78 thus forming a simplex pump. The coupling 78 may be attached to one or both of the piston rods 74 or 76. If both the piston rods 74 and 76 are secured by the coupling 78, the accumulator 66 is charged by applying hydraulic pressure through the driving cylinder 70 through line 80 controlled by valve 82. This introduces the hydraulic fluid on the side of the piston 72 opposite from the piston rod 76. Piston 72 through piston rod 76, coupling 78 and piston rod 74 forces the piston 68 in the accumulator towards the end of the accumulator. This movement of the piston 68 of the accumulator 66 forces the air above the piston 68 in the accumulator out of the cylinder through launch valve 96 and line 100 into a high pressure air flask or reservoir 84 to charge or recharge the reservoir 84, which is typically 60 cubic feet in capacity to an air pressure of about 3,000 psi.

As the driving cylinder 70 drives the piston 68 in the accumulator 66 towards the top of the cylinder, propellant, either mono-or bi, or water is drawn from a supply tank 86 through feed valve 88 into the accumulator cylinder 66 below the accumulator piston 68 filling the accumulator volume below the accumulator cylinder piston 68 with propellant, for instance, as it is driven to the top of the accumulator. The feed valve 88 to the accumulator is then closed providing a hydraulic lock and maintaining the filled accumulator in a charged or ready-to-launch position. Throttling valve 90 is closed at this time.

Hydraulic fluid is drained from the driving cylinder 70 by introduction of high pressure purge air from air supply line 92 through purge valve 94. The hydraulic fluid is returned to the hydraulic pump reservoir through valve 82 and supply line 80. This is done to remove any source of fluid resistance to movement of the driving piston 72 and accumulator piston 68. During such movement, the space below the hydraulic driving cylinder piston 72 is vented through line 80 to a vent to atmosphere (not shown).

Figures 5A, 6:
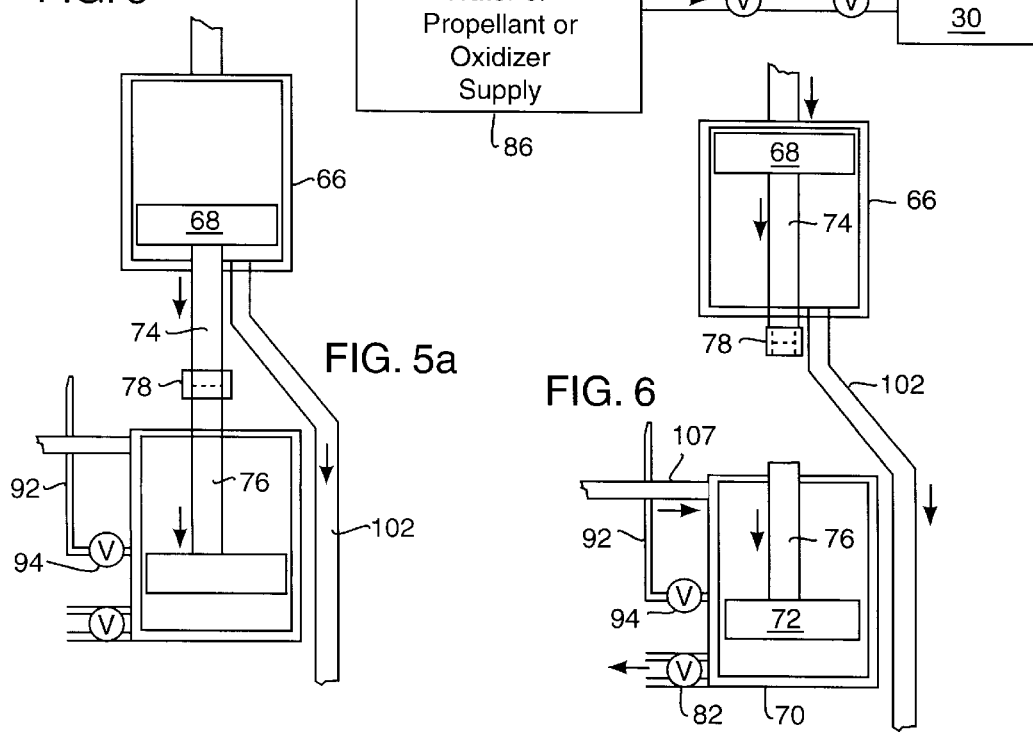
FIG. 5A is a schematic view partially cut away of the feed system of FIG. 5 showing the movement of the pistons and the flow of the propellant or water during the feed stroke.
FIG. 6 is a view similar to that of FIG. 5A showing an alternate embodiment of the piston feed system.

When a launch is initiated, feed valve 88 is closed. Launch valves 96 and 98 are opened. Opening of throttling control valve 90 is initiated. The high pressure air in the air flask or reservoir 84 through line 100 and valve 96 drives accumulator piston 68 down. This drives piston 72 together with the coupled piston rods 74 and 76 to the opposite ends of their travel. This drives the propellant or water out of the accumulator cylinder 66 through feed line 102 and throttling valve 90 into the combustors 30 through conduit and fittings or injectors 60 or, if water, to the manifold 38 through line 40. By varying the port size of throttling valve 90, the rate of flow of the propellant in the form of fuel and oxidizer into the; combustors 30 and the rate of flow of water into the water manifold 38 are controlled and the mass flow output of the combustors is varied. FIG. 5A shows the pistons near the end of the feed stroke.

An alternative mode of operation is disclosed in FIG. 6 for feeding the propellant (fuel and oxidizer)/water. As previously stated regarding the embodiment of FIG. 5, coupling 78 may be disconnected or not fixed to piston rod 76. In such instance piston rod 76 may enter coupling 78 but not be engaged by the coupling. The operation of the feed system is then as depicted in FIG. 6. The initial operation wherein the driving cylinder 70 causes the accumulator piston 68 to be driven to the top of the accumulator cylinder 66 so that the accumulator is filled with fuel or oxidizer or water is the same operation as previously described. However, rather than emptying the hydraulic fluid from the driving cylinder 70 coupling 78 is deactivated. Piston 72 with rod 76 of driving cylinder 70 is then retracted from the coupling 78 and driven to the far end of its travel by hydraulic pressure through valve 98 and line 107. Hydraulic fluid from the bottom of cylinder 70 returns through line 80 and valve 82 to pump 66. Hydraulic fluid in top of cylinder 70 is then returned to pump 66 by purge air through valve 94 and line 92. Now when the accumulator piston 68 is driven downwardly during launch, its piston rod 74 meets no resistance from the driving cylinder 70. The flow of the propellant or oxidizer or water out of the accumulator 66 through the throttling valve 90 is the same as described previously. This may be the preferred mode of operation because it eliminates any resistance, however small, to movement of accumulator piston 68.

Makeup air is supplied to the system through line 104 and through valve 106 from air supply 108 as best shown in FIG. 5. The purpose of the makeup air is to account for any small amount of air that may be lost during operation of the system. The same source supplies purge air through line 92 and valve 94 to purge hydraulic fluid from driving cylinder 70 as previously described.

This system as described in FIGS. 5, 5A and 6 as stated applies to the fuel as well as to the oxidizer. However it is also desirable to use a third distinct feed system that is substantially identical to that disclosed in FIGS. 5, 5A and 6 to supply the water to the water manifold 38 for conversion to steam as previously described.

Figure 7:
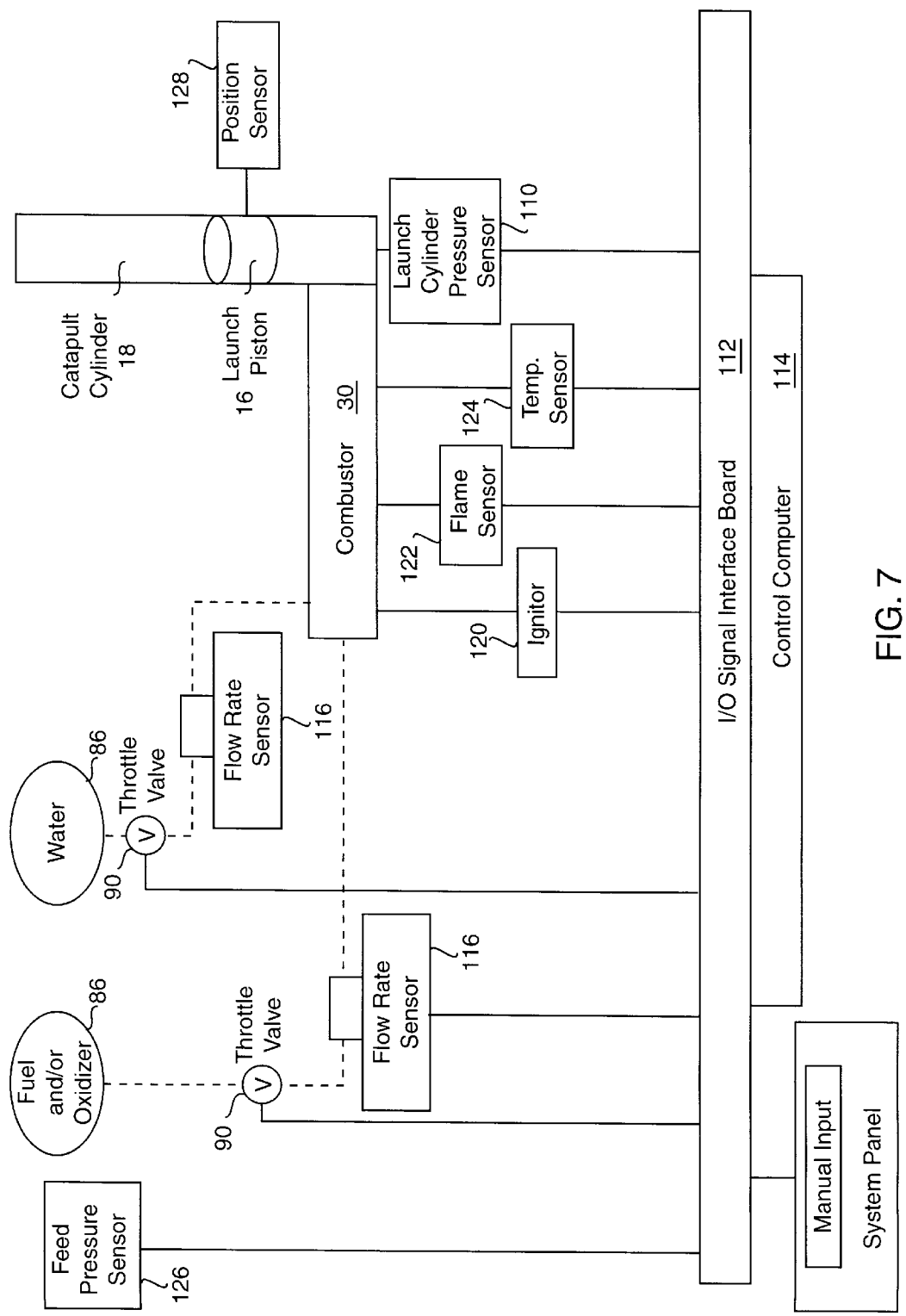
FIG. 7 is a schematic drawing of the control system of the present invention.

FIG. 7 is a diagrammatic showing of the control of the operation of the launch. Much of what is shown in the schematic presentation of FIG. 7 has already been described and the common identifying numerals will be used. Throughout the launch sequence, pressure in the catapult cylinder or launch tube 18 is sensed by conventional pressure sensor 110 located on the launch tube as shown in FIG. 2 and a signal that is sent to a conventional signal interface board operated by a control computer 114 all as conventional. The fuel, oxidizer and water each has a flow rate sensor 116 and a feed pressure sensor 126 to sense the flow rate and pressure of the particular liquids into the respective combustors and water manifold. The location of such sensors would be just prior to the entry into the injector assembly 42 for the fuel or oxidizer together or separately and just prior to entry into the water manifold 38 for the water. An igniter signal 120 energizes the igniters. The flame sensor 122 determines the presence of flame in the launch gas plenum 26. A temperature sensor 124 senses the temperature in the launch gas plenum 26. Feed pressure sensor 126 senses the pressure of the propellant or water at the time of the ignition. Position sensors 128 positioned along the catapult cylinder or launch tube 18, only one of which is shown in FIG. 2, determine the position of the launch piston 16.

With this closed-loop control system, when the catapult cylinder 18 pressure is in the normal operating band no corrective action need be taken. However when the cylinder pressure reaches a high pressure warning level or the position sensor indicates the piston is ahead of its desired position a signal is sent through the control computer 114 to reduce the rate of increase of fuel/oxidizer flow rate through the throttle valve 90 to correct the catapult cylinder 18 pressure. Similarly, if the catapult cylinder 18 pressure is low or the piston behind its desired position, the propellant flow rate is increased. If the pistons 16 continue to lag desired position, for example because of engine malfunction in the aircraft the control computer will increase combustor output bringing as required all combustors to their potentially full capacity to produce greater pressure on the piston to assure proper launch end speed.

I claim:

1. An internal combustion airplane catapult launcher comprising:
   an elongated launch tube,
   a movable piston fitted within said launch tube for connection to an airplane to be launched,
   a plurality of combustors in fluid communication with the aft end of said launch tube and the trailing end of said piston,
   an injector assembly including at least one injector for supplying a combustible propellant to each of said combustors for combustion,
   said injector assembly including at least one igniter operatively positioned with respect to said combustor for igniting said combustible propellant,
   whereby upon said propellant being fed into said combustors and ignited by said igniters, the piston is projected down the launch tube to launch the aircraft.

2. The launcher of claim 1 including, said combustible propellant including an oxidizer and a fuel.

3. The launcher of claim 2 including, said propellant including hydroxylammonium nitrate and a hydrocarbon fuel.

4. The launcher of claim 3 including, said bipropellant being 97–75% by weight oxidizer and 3–25% by weight hydrocarbon fuel.

5. The launcher of claim 4 including, said bipropellant being 91–93% by weight oxidizer and 7–9% by weight hydrocarbon fuel.

6. The launcher of claim 1 including,
   water injection means forward of said combustor to form steam upon contact with combustion products from said combustion.

7. The launcher of claim 6 including,
   said water injection means including a manifold around said launch tube having a plurality of water spray nozzles directed toward the interior of said combustor and into contact with said combustion products.

8. The launcher of claim 1 including,
   means to detect changes in pressure in said launch tube for metering the propellant fed to the combustors.

9. The launcher of claim 1 including,
   said combustible propellant being a bipropellant,
   said bipropellant including hydroxylammonium nitrate and a hydrocarbon fuel, and
   water injection means forward of said combustor to form steam upon contact with combustion products from said combustion.

10. The launcher of claim 1 including,
    water injection means forward of said combustor to form steam upon contact with combustion products from said combustion, and
    means to detect changes in pressure in said launch tube for metering the propellant fed to the combustors.

11. The launcher of claim 1 including,
    means to detect the position of said piston in said launch tube for metering the propellant fed to the combustors.

12. The launcher of claim 1 including,
    water injection means forward of said combustor to form steam upon contact with combustion products from said combustion,
    means to detect changes in pressure in said launch tube for metering the propellant fed to the combustors, and
    means to detect the position of said piston in said launch tube for metering the propellant fed to the combustors.

13. The launcher of claim 1 including,
    means to detect the presence of a flame in each said combustor.

14. The launcher of claim 1 including,
    water injection means forward of said combustor to form steam upon contact with combustion products from said combustion,
    means to detect changes in pressure in said launch tube for metering the propellant fed to the combustors,
    means to detect the position of said piston in said launch tube for metering the propellant fed to the combustors, and
    means to detect the presence of a flame in each said combustor.

15. The launcher of claim 1 including,
    each said combustor having at least one injector assembly positioned on said combustor for injecting said combustible propellant into said combustor and igniting said fuel with said igniter.

16. The launcher of claim 1 including, each said combustor having at least one injector assembly positioned on said combustor for injecting said combustible propellant into said combustor and igniting said fuel with said igniter, and water injection means forward of said combustor to form steam upon contact with combustion products from said combustion.

17. The launcher of claim 1 including, said injector assembly each being provided with a plurality of injectors of said propellant and positioned to direct said propellant into the interior of said combustor for combustion by said igniter.

18. The launcher of claim 1 including, each said combustor having at least one injector assembly positioned on said combustor for injecting said combustible propellant into said combustor and igniting said propallant with said igniter, said injector assembly each being provided with a plurality of injectors of said propellant and positioned to direct said propellant into the interior of said ignition for combustion by said igniter, water injection means forward of said combustor to form steam upon contact with combustion products from said combustion, and said water injection means including a manifold around said launch tube having a plurality of water spray nozzles directed toward the interior of said combustor and into contact with said combustion products.

19. The launcher of claim 1 including, said combustible propellant being a bipropellant, said bipropellant including hydroxylammonium nitrate and a hydrocarbon fuel, water injection means forward of said combustor to form steam upon contact with combustion products from said combustion, said water injection means including a manifold around said launch tube having a plurality of water spray nozzles directed toward the interior of said combustor and into contact with said combustion products, each said combustor having at least one injector assembly positioned on said combustor for injecting said combustible propellant into said combustor and igniting said fuel with said igniter, and said injector assembly each being provided with a plurality of injectors of said propellant and positioned to direct said propellant into the interior of said combustor for combustion by said igniter.

20. The launcher of claim 1 including, a feed system to supply said combustible propellant to said injector assembly, said feed system comprising:
an accumulator for receiving and discharging said propellant and having a piston operable therein,
a source of high pressure fluid in communication with one side of said piston to drive said piston,
a propellant source in communication with said accumulator on the opposite side of said piston to supply propellant to said accumulator,
conduit means for permitting flow of propellant between said accumulator and said combustor, and
flow control means for controlling the flow of propellant from said accumulator to said injector assembly.

21. The launcher of claim 1 including, said combustible propellant being a bipropellant, said bipropellant including hydroxylammonium nitrate and a hydrocarbon fuel, water injection means forward of said combustor to form steam upon contact with combustion products from said combustion, a feed system to supply said combustible propellant to said injector assembly, said feed system comprising:
an accumulator for receiving and discharging said fuel and having a piston operable therein,
a source of high pressure fluid in communication with one side of said piston to drive said piston,
a propellant source in communication with said accumulator on the opposite side of said piston to supply propellant to said accumulator,
conduit means for permitting flow of propellant between said accumulator and said combustors, and
flow control means for controlling the flow of propellant from said accumulator to said injector assembly.

22. The launcher of claim 1 including, said combustible propellant being a bipropellant, said bipropellant including hydroxylammonium nitrate and a hydrocarbon fuel, water injection means forward of said combustor to form steam upon contact with combustion products from said combustion, a feed system to supply said combustible propellant to said injector assembly, said feed system comprising:
an accumulator for receiving and discharging said propellant and having a piston operable therein,
a source of high pressure fluid in communication with one side of said piston to drive said piston,
a propellant source in communication with said accumulator on the opposite side of said piston to supply propellant to said accumulator,
conduit means for permitting flow of propellant between said accumulator and said combustors, and
flow control means for controlling the flow of propellant from said accumulator to said injector assembly.

23. The launcher of claim 1 including, said combustible propellant being a bipropellant, said bipropellant including hydroxylammonium nitrate and a hydrocarbon fuel, water injection means forward of said combustor to form steam upon contact with combustion products from said combustion, means to detect changes in pressure in said launch tube for metering the propellant fed to the combustors, a feed system to supply said combustible propellant to said injector assembly, said feed system comprising:
an accumulator for receiving and discharging said propellant and having a piston operable therein,
a source of high pressure fluid in communication with one side of said piston to drive said piston,
a propellant source in communication with said accumulator on the opposite side of said piston to supply propellant to said accumulator,
conduit means for permitting flow of propellant between said accumulator and said combustors, and
flow control means for controlling the flow of propellant from said accumulator to said injector assembly.

24. The launcher of claim 1 including, said combustible propellant being a bipropellant, said bipropellant including hydroxylammonium nitrate and a hydrocarbon fuel, said bipropellant being 91–93% by weight oxidizer and the combustible fuel being 5–8% by weight hydrocarbon fuel, water injection means forward of said combustor to form steam upon contact with combustion products from said combustion, means to detect changes in pressure in said launch tube for metering the propellant fed to the combustors, means to detect the position of said piston in said launch tube for metering the propellant fed to the combustors, means to detect the presence of a flame in each said combustor, a feed system to supply said combustible propellant to said injector assembly, said feed system comprising:
  an accumulator for receiving and discharging said propellant and having a piston operable therein,
  a source of high pressure fluid in communication with one side of said piston to drive said piston,
  a propellant source in communication with said accumulator on the opposite side of said piston to supply propellant to said accumulator,
  conduit means for permitting flow of propellant between said accumulator and said combustors, and
  flow control means for controlling the flow of propellant from said accumulator to said injector assembly.

25. The launcher of claim 1 including, water injection means forward of said combustor to form steam upon contact with combustion products from said combustion, each said combustor having at least one injector assembly positioned on said combustor for injecting said combustible propellant into said combustor and igniting said fuel with said igniter, a feed system to supply said combustible propellant to said injector assembly, said feed system comprising:
  an accumulator for receiving and discharging said propellant and having a piston operable therein,
  a source of high pressure fluid in communication with one side of said piston to drive said piston,
  a propellant source in communication with said accumulator on the opposite side of said piston to supply propellant to said accumulator,
  conduit means for permitting flow of propellant between said accumulator and said combustors, and
  flow control means for controlling the flow of propellant from said accumulator to said injector assembly.

26. The launcher of claim 1 including, water injection means forward of said combustor to form steam upon contact with combustion products from said combustion, means to detect changes in pressure in said launch tube for metering the propellant fed to the combustors, each said combustor having at least one injector assembly positioned on said combustor for injecting said combustible propellant into said combustor and igniting said fuel with said igniter, a feed system to supply said combustible propellant to said injector assembly, said feed system comprising:
  an accumulator for receiving and discharging said propellant and having a piston operable therein,
  a source of high pressure fluid in communication with one side of said piston to drive said piston,
  a propellant source in communication with said accumulator on the opposite side of said piston to supply propellant to said accumulator,
  conduit means for permitting flow of propellant between said accumulator and said combustors, and
  flow control means for controlling the flow of propellant from said accumulator to said injector assembly.

27. The launcher of claim 1 including, water injection means forward of said combustor to form steam upon contact with combustion products from said combustion, said water injection means including a manifold around said launch tube having a plurality of water spray nozzles directed toward the interior of said combustor and into contact with said combustion products, each said combustor having at least one injector assembly positioned on said combustor for injecting said combustible propellant into said combustor and igniting said fuel with said igniter, said injector assembly each being provided with a plurality of injectors of said propellant and positioned to direct said propellant into the interior of said combustor for combustion by said igniter, and means to detect changes in pressure in said launch tube for metering the propellant fed to the combustors.

28. The launcher of claim 1 including, water injection means forward of said combustor to form steam upon contact with combustion products from said combustion, said water injection means including a manifold around said launch tube having a plurality of water spray nozzles directed toward the interior of said combustor and into contact with said combustion products, each said combustor having at least one injector assembly positioned on said combustor for injecting said combustible propellant into said combustor and igniting said fuel with said igniter, said injector assembly each being provided with a plurality of injectors of said propellant and positioned to direct said propellant into the interior of said combustor for combustion by said igniter, means to detect changes in pressure in said launch tube for metering the propellant fed to the combustors, a feed system to supply said combustible propellant to said injector assembly, said feed system comprising:
  an accumulator for receiving and discharging said fuel and having a piston operable therein,
  a source of high pressure fluid in communication with one side of said piston to drive said piston,
  a propellant source in communication with said accumulator on the opposite side of said piston to supply propellant to said accumulator,
  conduit means for permitting flow of propellant between said accumulator and said combustors, and
  flow control means for controlling the flow of propellant from said accumulator to said injector assembly.

29. The launcher of claim 1 including, said combustible propellant being a bipropellant, said bipropellant including hydroxylammonium nitrate and a hydrocarbon fuel, means to detect the position of said piston in said launch tube for metering the propellant fed to the combustors, means to detect the presence of a flame in each said combustor, water injection means forward of said combustor to form steam upon contact with combustion products from said combustion, said water injection means including a manifold around said launch tube having a plurality of water spray nozzles directed toward the interior of said combustor and into said combustion products, each said combustor having at least one injector assembly positioned on said combustor for injecting said combustible propellant into said combustor and igniting said fuel with said igniter, said injector assembly each being provided with a plurality of injectors of said propellant and positioned to direct said propellant into the interior of said combustor for combustion by said igniter, means to detect changes in pressure in said launch tube for metering the propellant fed to the combustors, a feed system to supply said combustible propellant to said injector assembly, said feed system comprising:
an accumulator for receiving and discharging said propellant and having a piston operable therein,
a source of high pressure fluid in communication with one side of said piston to drive said piston,
a propellant source in communication with said accumulator on the opposite side of said piston to supply propellant to said accumulator,
conduit means for permitting flow of propellant between said accumulator and said combustors, and
flow control means for controlling the flow of propellant from said accumulator to said injector assembly.

30. A method of converting an existing steam aircraft catapult having a steam system, a thrust-exhaust manifold, a piston for connection to an aircraft and a launch tube, into an internal combustion catapult comprising:

removing the existing steam system aft of the thrust-exhaust manifold, attaching a launch gas plenum including a water injection manifold to the existing thrust exhaust manifold, attaching a combustor manifold to said launch gas plenum, attaching one or more combustors to the combustor manifold, installing propellant and water feed systems, attaching the propellant feed system to the combustors, attaching the water feed system to the water injection manifold, securing a plurality of igniters to the combustors, whereby upon said propellant being fed into said combustors and ignited by said igniters, the piston is projected down the launch tube to launch the aircraft.

* * * * *

UNITED STATES PATENT AND TRADEMARK OFFICE
CERTIFICATE OF CORRECTION

PATENT NO. : 6,007,022
DATED : December 28, 1999
INVENTOR(S) : Clinton W. Stallard, III It is certified that error appears in the above-identified patent and that said Letters Patent is hereby corrected as shown below:

In col. 2, line 57, delete "thrustexhaust" and insert therefor -- thrust-exhaust --.

In col. 5, line 46, insert "feed" before "system".

In col. 6, line 33, delete ";".

In the Claims:

In Claim 18, line 5, delete "propallant" and insert therefor -- propellant --;

line 8, delete "ignition" and insert therefor -- combustor --;

line 9, delete "combustion" and insert therefor -- ignition --.

Signed and Sealed this

Thirteenth Day of February, 2001

*Attest:*

NICHOLAS P. GODICI

*Attesting Officer*  Acting Director of the United States Patent and Trademark Office